(12) United States Patent
Guo et al.

(10) Patent No.: US 10,959,115 B2
(45) Date of Patent: Mar. 23, 2021

(54) COMMUNICATION METHODS AND DEVICES FOR JOINT OPTIMIZATION OF TRANSMIT POWER AND TRANSMISSION RATE

(71) Applicant: Alcatel Lucent, Nozay (FR)

(72) Inventors: Haiyou Guo, Shanghai (CN); Xinghua Shi, Shanghai (CN)

(73) Assignee: Alcatel Lucent, Nozay (FR)

( * ) Notice: Subject to any disclaimer, the term of this patent is extended or adjusted under 35 U.S.C. 154(b) by 8 days.

(21) Appl. No.: 16/466,818

(22) PCT Filed: Dec. 4, 2017

(86) PCT No.: PCT/IB2017/001614
§ 371 (c)(1),
(2) Date: Jun. 5, 2019

(87) PCT Pub. No.: WO2018/104776
PCT Pub. Date: Jun. 14, 2018

(65) Prior Publication Data
US 2019/0297512 A1 Sep. 26, 2019

(30) Foreign Application Priority Data
Dec. 5, 2016 (CN) .......................... 201611105661.6

(51) Int. Cl.
*H04W 24/02* (2009.01)
*H04B 17/309* (2015.01)
(Continued)

(52) U.S. Cl.
CPC .......... *H04W 24/02* (2013.01); *H04B 17/309* (2015.01); *H04W 28/0236* (2013.01);
(Continued)

(58) Field of Classification Search
CPC .................................................. H04B 17/309
See application file for complete search history.

(56) References Cited

U.S. PATENT DOCUMENTS 8,289,866 B2 * 10/2012 Sambhwani .......... H04W 52/50
370/252
2004/0160914 A1 8/2004 Sarkar
(Continued)

FOREIGN PATENT DOCUMENTS

CN 1357987 A 7/2002
CN 101534138 A 9/2009
(Continued)

OTHER PUBLICATIONS

Berggren et al., "Energy-Efficient Control of Rate and Power in DS-CDMA Systems", May 2004, submitted as prior art by the applicant (Year: 2004).*
(Continued)

*Primary Examiner* — Jamaal Henson
(74) *Attorney, Agent, or Firm* — Fay Sharpe LLP

(57) ABSTRACT

Embodiments of the present disclosure provide communication methods and devices for joint optimization of transmit power and transmission rate to ensure user fairness. The method described herein comprises: obtaining, from receivers of a plurality of communication links, respective normalized power values of sums of interference and noise experienced by the receivers and transmit power values of transmitters of the plurality of communication links. Each of the plurality of links supports a plurality of service types of transmissions, respective transmission rate targets are defined for the plurality of service types according to different qualities of service required by the plurality of service types, and the transmission rate targets are sorted as a first sequence in a first order. The method also comprises determining, for the plurality of links, values of non-linear
(Continued)

combinations of the transmit powers and the normalized powers corresponding to the plurality of links respectively. The method also comprises arranging the values of the non-linear combinations corresponding to the plurality of links as a second sequence in the first order. The method also comprises providing the transmitters of the plurality of links with location sequence numbers of the values of the non-linear combinations in the second sequence.

16 Claims, 9 Drawing Sheets

(51) Int. Cl.
H04W 28/02 (2009.01)
H04W 52/24 (2009.01)
H04W 52/26 (2009.01)
H04W 52/38 (2009.01)

(52) U.S. Cl.
CPC ....... *H04W 52/241* (2013.01); *H04W 52/267* (2013.01); *H04W 52/386* (2013.01); *H04W 52/265* (2013.01)

(56) References Cited

U.S. PATENT DOCUMENTS

| | | | | |
|---|---|---|---|---|
| 2005/0141461 A1* | 6/2005 | Hosein | ............... | H04W 28/22 370/335 |
| 2006/0259627 A1* | 11/2006 | Kellerer | ............ | H04L 29/06027 709/227 |
| 2006/0268933 A1* | 11/2006 | Kellerer | ............... | H04L 67/14 370/469 |
| 2006/0280160 A1* | 12/2006 | Padovani | ............... | H04L 1/0002 370/347 |
| 2007/0019608 A1* | 1/2007 | Padovani | ............... | H04B 7/264 370/347 |
| 2007/0067267 A1* | 3/2007 | Ives | ............... | G06F 16/951 |
| 2009/0228935 A1 | 9/2009 | Delwaulle | | |
| 2009/0252052 A1* | 10/2009 | Sambhwani | ........ | H04W 52/325 370/252 |
| 2010/0322090 A1* | 12/2010 | Zhang | ............... | H04W 52/42 370/252 |
| 2013/0215812 A1 | 8/2013 | Hu et al. | | |
| 2013/0310058 A1 | 11/2013 | Ibrahim et al. | | |
| 2014/0273869 A1 | 9/2014 | Zhao et al. | | |
| 2014/0286156 A1 | 9/2014 | Kohli | | |
| 2015/0146646 A1 | 5/2015 | Chen et al. | | |
| 2016/0080195 A1 | 3/2016 | Ramachandran et al. | | |
| 2016/0218983 A1* | 7/2016 | Dao | ............... | H04L 65/602 |
| 2016/0226774 A1* | 8/2016 | Farmanbar | ............ | H04L 41/08 |
| 2016/0227432 A1 | 8/2016 | Freeman et al. | | |

FOREIGN PATENT DOCUMENTS

| | | |
|---|---|---|
| CN | 101640914 A | 2/2010 |
| CN | 101674532 A | 3/2010 |
| CN | 102158942 A | 8/2011 |
| CN | 102761359 A | 10/2012 |
| CN | 102769486 A | 11/2012 |
| CN | 102934476 A | 2/2013 |
| CN | 103532887 A | 1/2014 |
| CN | 104022794 A | 9/2014 |
| CN | 104660390 A | 5/2015 |
| CN | 104735694 A | 6/2015 |
| CN | 105188124 A | 12/2015 |
| EP | 2 031 763 A2 | 3/2009 |

OTHER PUBLICATIONS

F. Berggren et al., "Energy-Efficient Control of Rate and Power in DS-CDMA Systems," IEEE Transactions on Wireless Communications, vol. 3, No. 3, pp. 725-733, XP011112323, May 2004.
International Search Report for PCT/IB2017/001614 dated May 15, 2018.

* cited by examiner

COMMUNICATION METHODS AND DEVICES FOR JOINT OPTIMIZATION OF TRANSMIT POWER AND TRANSMISSION RATE

FIELD

Embodiments of the present disclosure generally relate to communication technologies, and more particularly, to communication methods and devices for joint optimization of transmit power and transmission rate to guarantee user fairness.

BACKGROUND

From the perspective of a vendor of wireless communication service, fairness is an utmost key performance index of network operation because users expect to have the same and uniform service experience regardless of their positions in a cell. Average throughput and frequency efficiency index values make only sense if a fairness criterion is fulfilled. Different scheduler and strategies of radio resource management (RMM) exhibit different fairness behavior.

In general, the fairness index is measured by the Cumulative Distribution Function (CDF) of user transmission rate. The steeper slope of the CDF, the better fairness. Conventional schedulers are unable to follow the desired normalized CDF of transmission rate directly. They are not directly designed in accordance with CDF requirements of normalized user rate. The conventional schedulers ensure user fairness in accordance with other criteria, e.g. proportional fairness or maxmin fairness. However, the profile of the CDF of user transmission rate is less conceived, constructed and maintained beforehand.

SUMMARY

Generally, embodiments of the present disclosure propose a fast implementation solution for joint optimization of transmit power and transmission rate to ensure user fairness.

In a first aspect, the embodiments of the present disclosure provide a communication method. The method comprises obtaining, from receivers of a plurality of communication links, respective normalized power values of sums of interference and noise experienced by the receivers and transmit power values of transmitters of the plurality of communication links. Each of the plurality of links supports a plurality of service types of transmissions, respective transmission rate targets are defined for the plurality of service types according to different qualities of service required by the plurality of service types, and the transmission rate targets are sorted as a first sequence in a first order. The method also comprises determining, for the plurality of links, values of non-linear combinations of the transmit powers and the normalized powers corresponding to the plurality of links respectively. The method also comprises arranging the values of the non-linear combinations corresponding to the plurality of links as a second sequence in the first order. The method also comprises providing the transmitters of the plurality of links with location sequence numbers of the values of the non-linear combinations in the second sequence.

In some embodiments, the values of non-linear combinations of the transmit powers and the normalized powers each comprise a sum of a reciprocal of a normalized power value and a reciprocal of a transmit power value corresponding to a same communication link of the plurality of communication links.

In a second aspect, the embodiments of the present disclosure provide a communication method. The method comprises obtaining, from a receiver of a first communication link of a plurality of communication links, a first normalized power value of a sum of interference and noise experienced by the receiver, each of the plurality of links supporting a plurality of service types of transmissions, respective transmission rate targets being defined for the plurality of service types according to different qualities of service required by the plurality of service types, and the transmission rate targets being sorted as a first sequence in a first order. The method also comprises obtaining a value of a transmission rate target corresponding to the first communication link and determining a service type corresponding to the value of the transmission rate target, the value of the transmission rate target being determined according to the first sequence and a location of a value of a non-linear combination of the first normalized power and a transmit power of a transmitter of the first communication link in a second sequence, the second sequence being obtained by arranging values of a plurality of non-linear combinations corresponding to the following of the plurality of communication links in the first order: normalized power values of sums of interference and noise experienced by receivers of the plurality of communication links, and transmit power values of transmitters of the plurality of communication links. The method also comprises obtaining a plurality of maximum normalized power constraint values for the plurality of communication links. The method also comprises updating the transmit power of the first communication link based on the value of the transmission rate target, the first normalized power value, and a maximum normalized power constraint value corresponding to the first communication link.

In some embodiments, the value of the non-linear combination of the first normalized power and the transmit power comprises a sum of a reciprocal of a normalized power value and a reciprocal of a transmit power value.

In some embodiments, updating the transmit power of the first communication link updating the transmit power of the first communication link comprises: updating the transmit power of the first communication link as a first transmit power value on the basis of based on the transmission rate target and the first normalized power value and the transmission rate target of the first communication link; and updating the transmit power of the first communication link as a second transmit power value on the basis of based on the maximum normalized power constraint value and the first transmit power value.

In some embodiments, updating the transmit power of the first communication link as the first transmit power value comprises updating the transmit power of the first communication link as the first transmit power value based on an equation:

$$p'_n(t+1) = 2^{\gamma_{R_t(n)}} \frac{I_n(t)p_n(t)}{I_n(t)+p_n(t)}, n=1, 2, \ldots, N$$

where $p'_n(t+1)$ represents the first transmit power value of a nth communication link among the plurality of communication link at a time t+1, $\gamma_{R_t(n)}$ represents the transmission rate target of the nth communication link at a time t+1, $I_n(t)$ represents the first normalized power value of the nth communication link at a time t+1, $p_n(t)$ represents a transmit power of the nth communication link at a time t+1, t is an arbitrary integer that is greater than or equal to 0, and N is an arbitrary integer that is greater than or equal to 2.

In some embodiments, updating the transmit power of the first communication link as the second transmit power value based on the maximum normalized power constraint value and the first transmit power value comprises updating the transmit power value as the second transmit power value based on an equation:

$$p_n(t+1) = \frac{p'_n(t+1)}{\overline{P}}, n = 1, 2, \ldots, N$$

where $p_n(t+1)$ represents the second transmit power value of a nth communication link among the plurality of communication links at a time t+1, and $\overline{P}$ represents the maximum normalized power constraint value.

In some embodiments, the maximum normalized power constraint value is determined based on an equation:

$$\overline{P} = \max_{m=1,2,\ldots M} \frac{1}{\overline{P}_m} \sum_{n=1}^{N} w_{mn} p'_n(t+1)$$

where M represents the number of power constraints and M≥1, $w_{mn}$ represents weights of the power constraints, and $w_{mn} \geq 0$, and $\overline{P}_m$ represents a power upper-limit value corresponding to a mth power constraint among the power constraints.

In a third aspect, the embodiments of the present disclosure provide a network device. The network device comprises a controller and a memory coupled to the controller and having instructions stored thereon. The instructions, when executed by the controller, cause the network device to perform acts including: obtaining, from receivers of a plurality of communication links, respective normalized power values of sums of interference and noise experienced by the receivers and transmit power values of transmitters of the plurality of communication links, each of the plurality of links supporting a plurality of service types of transmissions, respective transmission rate targets being defined for the plurality of service types according to different qualities of service required by the plurality of service types, and the transmission rate targets being sorted as a first sequence in a first order; determining, for the plurality of links, values of non-linear combinations of the transmit powers and the normalized powers corresponding to the plurality of links respectively; arranging the values of the non-linear combinations corresponding to the plurality of links as a second sequence in the first order; and providing the transmitters of the plurality of links with location sequence numbers of the values of the non-linear combinations in the second sequence In a fourth aspect, the embodiments of the present disclosure provide a terminal device. The terminal device comprises a controller and a memory coupled to the controller and having instructions stored thereon. The instructions, when executed by the controller, cause the network device to perform acts including: obtaining, from a receiver of a first communication link of a plurality of communication links, a first normalized power value of a sum of interference and noise experienced by the receiver, each of the plurality of links supporting a plurality of service types of transmissions, respective transmission rate targets being defined for the plurality of service types according to different qualities of service required by the plurality of service types, and the transmission rate targets being sorted as a first sequence in a first order; obtaining a value of a transmission rate target corresponding to the first communication link and determining a service type corresponding to the value of the transmission rate target, the value of the transmission rate target being determined according to the first sequence and a location of a value of a non-linear combination of the first normalized power and a transmit power of a transmitter of the first communication link in a second sequence, the second sequence being obtained by arranging values of a plurality of non-linear combinations corresponding to the following of the plurality of communication links in the first order: normalized power values of sums of interference and noise experienced by receivers of the plurality of communication links, and transmit power values of transmitters of the plurality of communication links; obtaining a plurality of maximum normalized power constraint values for the plurality of communication links; and updating the transmit power of the first communication link based on a value of a transmission rate target, the first normalized power value and a maximum normalized power constraint value corresponding to the first communication link.

It should be appreciated contents as described in the SUMMARY portion are not intended to limit key or important features of the embodiments of the present disclosure or used to limit the scope of the present disclosure. Other features of the present disclosure will become easier to understand from the following description.

BRIEF DESCRIPTION OF THE DRAWINGS

The above and other features, advantages and aspects of multiple embodiments of the present disclosure will become apparent from the following detailed illustration, when taken in conjunction with the accompanying drawings in which the same or similar reference numerals denote the same or similar elements, wherein.

DETAILED DESCRIPTION

Embodiments of the present disclosure will be described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure. It should be understood that the accompanying drawings and embodiments of the present disclosure are merely for the illustration purpose, rather than limiting the protection scope of the present disclosure.

The terms "comprise", "include" and their variants used here are to be read as open terms that mean "include, but is not limited to". The term "based on" is to be read as "based at least in part on". The term "one embodiment" is to be read as "at least one embodiment"; the term "another embodiment" is to be read as "at least one other embodiment". Definitions of other terms will be presented in description below.

Figure 1:
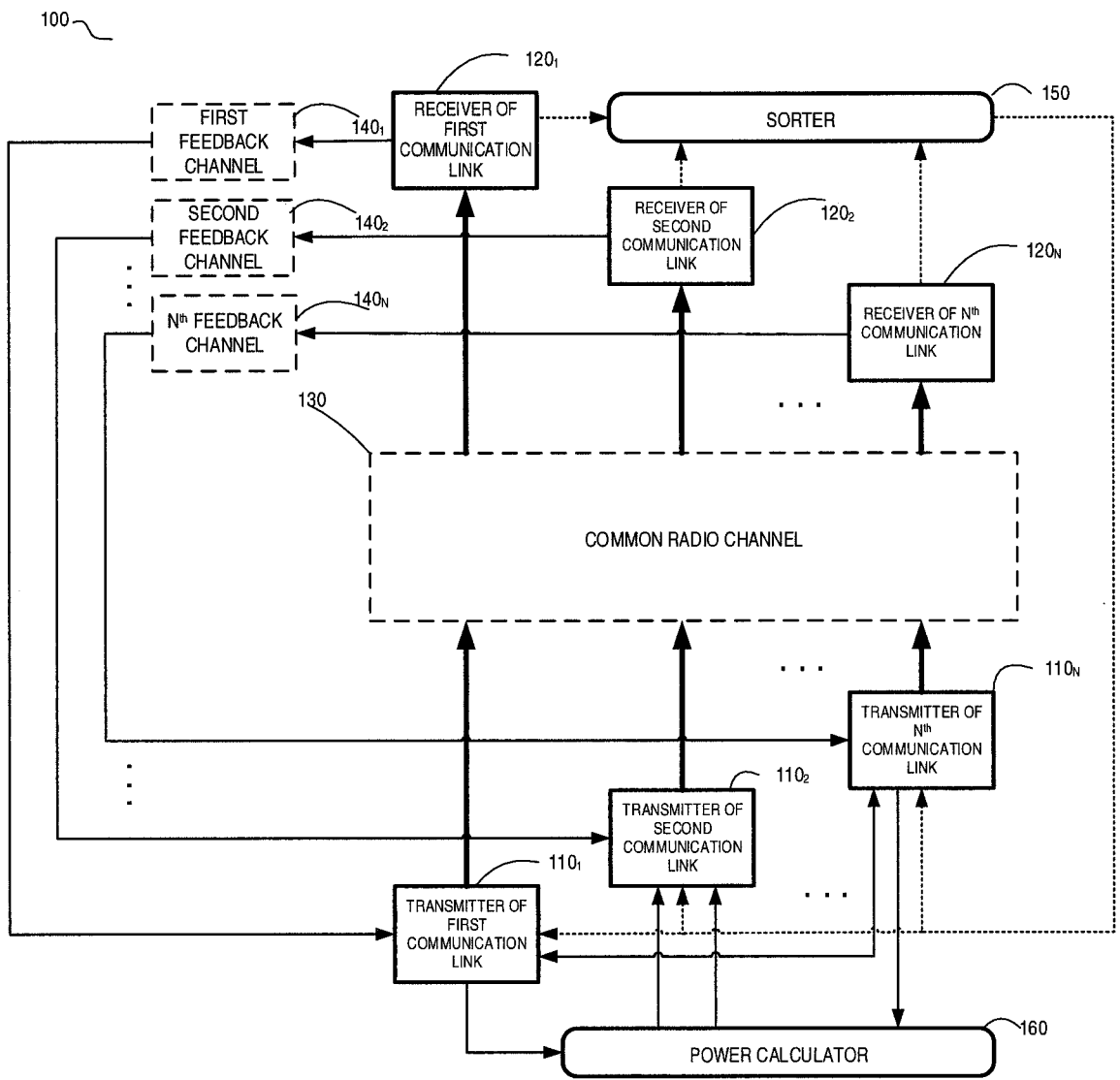
FIG. 1 shows an exemplary communication network in which some embodiments of the present disclosure may be implemented.

FIG. 1 shows an exemplary communication network 100 in which the embodiments of the present disclosure may be implemented.

The communication network 100 comprises a plurality of communication links, e.g. a first communication link, a second communication link, ..., the $N^{th}$ communication link, wherein N is an arbitrary integer greater than or equal to 2. Each of the plurality of communication links comprises a transmitter and a receiver. Specifically, the first communication link comprises a transmitter $110_1$ of the first communication link and a receiver $120_1$ of the first communication link, the second communication link comprises a transmitter $110_2$ of the second communication link and a receiver $120_2$ of the second communication link, ..., and the $N^{th}$ communication link comprises a transmitter $110_N$ of the $N^{th}$ communication link and a receiver $120_N$ of the $N^{th}$ communication link.

The transmitter of each of the plurality of communication links sends a data signal to a corresponding receiver over a common wireless channel 130.

In some embodiments, the transmitters $110_1$, $110_2$, ..., $110_N$ are located at the same terminal device. The terminal device refers to any terminal device that can perform wireless communication with a network device or between them. As an example, the terminal device may comprise a mobile terminal (MT), a personal digital assistant, a game machine, a wearable device, an on-board communication device, a machine-to-machine communication device, a sensor, etc. The term "terminal device" may be used interchangeably with "user equipment (UE)", mobile station, subscriber station, mobile terminal, user terminal or wireless device. In some embodiments, the transmitters $110_1$, $110_2$, ..., $110_N$ are located at different terminal devices.

In other embodiments, the transmitters $110_1$, $110_2$, ..., $110_N$ are located at the same network device. The network device may represent a node B (NodeB or NB), an Evolved Node B (eNodeB or eNB), a remote radio unit (RRU), a radio-frequency head (RH), a remote radio head (RRH), a repeater, or a low power node such as a Picocell, a Femto cell and the like. In other embodiments, the transmitters $110_1$, $110_2$, ..., $110_N$ are located at different network devices.

The receiver of each communication link feeds information back to a corresponding transmitter over their respective feedback channels. Specifically, the receivers $120_1$, $120_2$, ..., $120_N$ feed information back to the transmitters $110_1$, $110_2$, ..., $110_N$ over a first feedback channel $140_1$, a second feedback channel $140_2$, ..., an $N^{th}$ feedback channel $140_N$ respectively.

In embodiments where the transmitters $110_1$, $110_2$, ..., $110_N$ are located at the same terminal device, the receivers $120_1$, $120_2$, ..., $120_N$ may be located at the same network device. In embodiments where the transmitters $110_1$, $110_2$, ..., $110_N$ are respectively located at different terminal devices, the receivers $120_1$, $120_2$, ..., $120_N$ may be located either at the same network device or at different network devices.

The communication network 100 further comprises a sorter 150 (to be described in detail). In embodiments where the receivers $120_1$, $120_2$, ..., $120_N$ are located at the same network device, the sorter 150 may be located at the same network device as the receivers $120_1$, $120_2$, ..., $120_N$. Thereby, a centralized deployment of the sorter 150 and the receivers $120_1$, $120_2$, ..., $120_N$ is formed, which facilitates the sorter 150 to directly signal-interact with the receivers $120_1$, $120_2$, ..., $120_N$. Alternatively, the sorter 150 may be located at a different network device from the receivers $120_1$, $120_2$, ..., $120_N$. In this case, the sorter 150 may signal-interact with the receivers $120_1$, $120_2$, ..., $120_N$ and the transmitters $110_1$, $110_2$, ..., $110_N$ according to any appropriate communication protocol.

In embodiments where the receivers $120_1$, $120_2$, ..., $120_N$ are located at different network devices, the sorter 150 may be located at the same network device as any of the receivers $120_1$, $120_2$, ..., $120_N$. In other embodiments, the sorter 150 may be located at a different network device from each of the receivers $120_1$, $120_2$, ..., $120_N$. In this case, the sorter 150 may signal-interact with the receivers $120_1$, $120_2$, ..., $120_N$ and the transmitters $110_1$, $110_2$, ..., $110_N$ according to any appropriate communication protocol.

The communication network 100 further comprises a power calculator 160 (which is to be described in detail hereinafter). In embodiments where the transmitters $110_1$, $110_2$, ..., $110_N$ are located at the same terminal device, the power calculator 160 may be located at the same terminal device as the transmitters $110_1$, $110_2$, ..., $110_N$, which facilitates the power calculator 160 to directly signal-interact with the transmitters. In embodiments where the transmitters are respectively located at different terminal devices, the power calculator 160 may be located at the same network device as any of the transmitters $110_1$, $110_2$, ..., $110_N$. In other embodiments, the power calculator 160 may be located at a network device. In this case, the power calculator 160 may signal-interact with the transmitters $110_1$, $110_2$, ..., $110_N$ according to any appropriate communication protocol.

At present, many wireless standardization bodies have selected the normalized throughput bound as a fairness criterion. The normalized throughput bound defines a region in the normalized transmission-rate CDF plot. This region is defined by the line given by the three points {(0.1, 0.1), (0.2, 0.2), (0.5, 0.5)}, where the normalized transmission-rate CDF generated by the eligible schedulers should at least be right of the line. This evaluation methodology stipulates that at least 90% of the users should have at least 10% of the average rate. Conventional schedulers are not directly designed in accordance with CDF requirements of normalized user rate. They ensure user fairness in accordance with other criteria, e.g. Proportional Fairness or maxmin fairness. However, the profile of the CDF of user transmission rate is less conceived, constructed and maintained beforehand.

To at least partially solve the foregoing and other potential drawbacks and problems in the existing solutions, embodiments of the present disclosure propose a solution for joint optimization of transmit power and transmission rate while fulfilling a given normalized user transmission rate CDF.

Specifically, according to a given normalized user transmission rate CDF, it may be determined that values of elements in a sequence of transmission rate targets associated with a plurality of communication link are not completely identical. For example, regarding the first communication link, the second communication link, . . . , and the $N^{th}$ communication link, a sequence $S_\gamma=\{\gamma_1, \gamma_2, \ldots, \gamma_N\}$ of transmission rate targets may be determined, where $\gamma_1, \gamma_2, \ldots, \gamma_N$ denote a first, second, . . . , $N^{th}$ transmission rate target respectively, and their values are not completely identical. In general, for a sequence $S_\gamma=\{\gamma_1, \gamma_2, \ldots, \gamma_N\}$ of transmission rate targets, there exist N! transmission rate assignments. Each transmission rate assignment represents a specific assignment of transmission rate to the N communication links users, one to each. Here, each transmission rate target can only be assigned with one communication link.

The assignment may be modeled by a bijective mapping $\varphi$ between the sequence of a plurality of communication links and the sequence $S_\gamma$ of transmission rate targets. For instance, $\varphi(n)=m$ means that the communication link n is assigned with the transmission rate target $\gamma_m$. For a certain transmission rate-target assignment $\varphi(n)$, power optimization may be performed to maximize the minimum weighted (1+SINR), i.e. the following power optimization problem (P1) may be solved:

$$P1: \alpha(\varphi) = \max_p \min_n \frac{1 + SINR_n(p)}{2^{\gamma_{\varphi(n)}}} \quad (1)$$

$$\text{s.t.} \quad SINR_n(p) = \frac{G_{nn}p_n}{\sum_{\substack{m=1 \\ m \neq n}}^{N} G_{nm}p_m + \sigma_n^2}, n = 1, 2, \ldots, N$$

$$\sum_{n=1}^{N} w_{mn}p_n \leq \overline{P}_m, m = 1, 2, \ldots, M$$

where $G_{nm}$ represents the channel gain from the transmitter of the communication link m to the receiver of the communication link n, $p_n$ represents the transmit power of the communication link n and $p=[p_1\ p_2\ \ldots\ p_N]$, $\sigma_n^2$ represents the noise power at the receiver of the communication link n. Inequalities $$\sum_{n=1}^{N} w_{mn}p_n \leq \overline{P}_m$$

model the general linear power constraints, accounting for the interference control constraints of the transmitters of all or a certain communication link on the receiver m and the constraint on the limit of transmit power of the transmitter of the communication link n by appropriately setting the weights of power constraints to any value greater than or equal to 0.

Suppose the optimal solver $p^*_\varphi$ may be obtained by solving the foregoing power optimization problem P1, then for the optimal solver $P^*_\varphi$:

$$\alpha(\varphi) = \frac{1 + SINR_n(p^*_\varphi)}{2^{\gamma_{\varphi(n)}}} \quad (2)$$

After the logarithm to base 2 of two sides of the equality in Equation (2), Equation (2) may be transformed to:

$$\log_2(1+SINR_n(p^*_\varphi))=\gamma_{\varphi(n)}+\log_2\alpha(\varphi) \quad (3)$$

As seen from Equation (3), the actual operational rates of a plurality of links achieve the same incremental (or decrement) relative to their respective transmission rate targets.

Equation (3) shows that exchanging the individual transmission rate targets among a plurality of communication links does not alter the shape (slope) of the empirical CDF of transmission rate. Different rate assignments have the same normalized user transmission-rate CDF, and exchanging the individual transmission rate targets just leads to horizontal shifts of CDF curve. The normalized CDF of the resultant transmission rate is only depending on the sequence $S_\gamma$ no matter which communication link the individual transmission rate target in the sequence $S_\gamma$ is assigned to. The sequence $S_\gamma=\{\gamma_1, \gamma_2, \ldots, \gamma_N\}$ can be the samples of a given normalized CDF ($F(\gamma)$), such that $F(\gamma_n)=n/N$.

In practical application, it is desirable to find out the optimal assignment out of the N! transmission rate assignments in sense of maximizing $\alpha(\varphi)$. The throughput gain due to transmission rate assignment is substantial. To this end, the power optimization problem (P1) is extended as the following optimization problem (P2) by treating $\varphi \in S_N$ as an additional optimization dimension, where $S_N=\{\{1, 2, 3, \ldots, N\}, \{2, 1, 3, \ldots, N\}, \ldots\}$ represents the set of all possible assignments sequences of N items and $|S_N|=N!$, $|\cdot|$ represents the cardinality of a set (i.e. the number of sequences in the set):

$$P2: \alpha = \max_{p,\varphi \in S_n} \min_n \frac{1 + SINR_n(p)}{2^{\gamma_{\varphi(n)}}} \quad (4)$$

$$\text{s.t.} \quad SINR_n(p) = \frac{G_{nn}p_n}{\sum_{\substack{m=1 \\ m \neq n}}^{N} G_{nm}p_m + \sigma_n^2}, n = 1, 2, \ldots, N$$

$$\sum_{n=1}^{N} w_{mn}p_n \leq \overline{P}_m, m = 1, 2, \ldots, M$$

Such a joint optimization of transmit power and rate assignment involves a mixed-integer nonlinear programming problem. The above optimization problem (P2) can be solved to global optimality through exhaustive search over all possible rate assignments. This exhaustive solver method needs to solve the optimization problem (P1) N! times, each under N given rate assignments. For instance, when N=8, the optimization problem P1 needs to be solved 8!=40320 times. This means the computational complexity of the enumeration approach is unacceptable in the practical application. Therefore, there is a need for a suboptimal algorithm to make a tradeoff between performance and complexity.

The solver of the optimization problem P2 corresponds to optimal power control for the maximal sum rate while meeting a given normalized empirical CDF of transmission rate. The desired normalized user transmission-rate CDF can be constructed in advance by setting values of elements in the sequence $S_\gamma$. The embodiments of the present disclosure provide a solution approaching the global optimum of the above optimization problem P2 with quite low computational overhead. The solution of the present disclosure can meet requirements of the normalized user-rate CDF constructed in advance.

Figure 2:
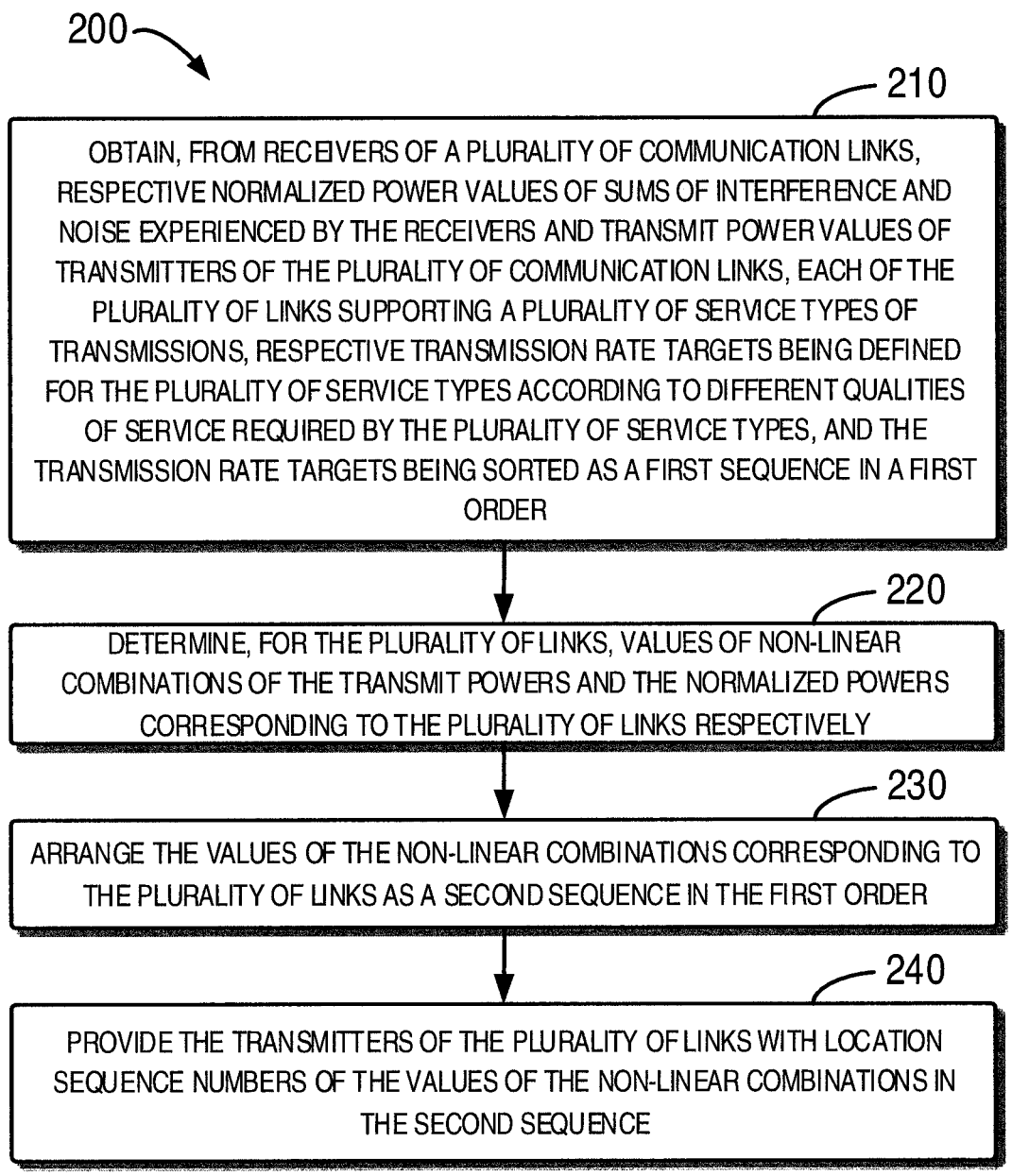
FIG. 2 shows a flowchart of a communication method according to some embodiments of the present disclosure.

With reference to FIGS. 2 to 10, a detailed description is given to the embodiments of the present disclosure. FIG. 2 shows a flowchart of a communication method 200 according to some embodiments of the present disclosure. In some embodiments, the method 200 may be implemented by the sorter 150 in FIG. 1, for example. It will be appreciated that the method 200 may further include additional acts that are not shown and/or may omit acts that are shown. The scope of the embodiments of the present disclosure is not limited in this regard.

At 210, the sorter 150 obtains, from receivers of a plurality of communication links, respective normalized power values of sums of interference and noise experienced by the receivers and transmit power values of transmitters of the plurality of communication links. For example, in the embodiment as shown in FIG. 1, the sorter obtains from the receivers $120_1$, $120_2$, ..., and $120_N$ respective normalized power values of sums of interference and noise experienced by the receivers $120_1$, $120_2$, ..., and $120_N$ and transmit power values of the transmitters $110_1$, $110_2$, ..., and $110_N$.

In some embodiments, the receivers $120_1$, $120_2$, ..., and $120_N$ may determine the corresponding normalized power values of the sums of interference and noise according to an equation below:

$$I_n(t) = \frac{1}{G_{nn}} \left( \sum_{\substack{m=1 \\ m \neq n}}^{N} G_{nm} p_m(t) + \sigma_n^2 \right) \quad (5)$$

where $I_n(t)$ represents the normalized power value of a sum of interference and noise experienced by the receiver n at time t, $G_{nm}$ represents the channel gain from the transmitter of the communication link m to the receiver of the communication link n, $p_m(t)$ represents the transmit power of the transmitter of the communication link m at time t, $\sigma_n^2$ represents the noise power at the receiver of the communication link n, $G_{nm}$ represents the channel gain from the transmitter of the communication link n to the receiver of the communication link m, and t is an arbitrary integer greater than or equal to 0.

It will be appreciated that the receiver determining the normalized power values of sums of interference and noise according to Equation (5) is merely exemplary and not intended to limit the scope of the present disclosure. In fact, the receivers may determine the normalized power values of sums of interference and noise in any appropriate manner, and the scope of the present disclosure is not limited in this regard.

In some embodiments, upon determining the corresponding normalized power values of the sums of interference and noise, the sorter 150 may provide the corresponding normalized power value $I_n(t)$ to corresponding one of the receivers $120_1$, $120_2$, ..., and $120_N$. Subsequently, the receivers $120_1$, $120_2$, ..., and $120_N$ may feed the normalized power values back to the transmitters $110_1$, $110_2$, ..., and $110_N$ over the first feedback channels $140_1$, $140_2$, ..., and $140_N$.

In the embodiments of the present disclosure, each of the plurality of links can support multiple service types of transmissions. Respective transmission rate targets are defined for the multiple service types according to different qualities of service required by the multiple service types. The transmission rate targets are sorted as a first sequence in a first order.

In some embodiments, the first sequence may be determined as $S_\gamma = \{\gamma_1, \gamma_2, \ldots, \gamma_N\}$, such that the desired $CDF(F(\gamma))$ of the normalized transmission rate meets $F(\gamma_n) = n/N$, where $\gamma_1, \gamma_2, \ldots, \gamma_N$ denote the first, the second, ..., the $N^{th}$ transmission rate target respectively, and their values are not completely identical. Since the empirical $CDF(F(\gamma))$ of the normalized transmission rate meets $F(\gamma_n) = n/N$, the fairness metric among the N communication links may be optimized by determining the value of $S_\gamma = \{\gamma_1, \gamma_2, \ldots, \gamma_N\}$.

In some embodiments, the transmission rate targets $\gamma_1, \gamma_2, \ldots, \gamma_N$ are arranged as a first sequence in non-decreasing order, i.e. $\gamma_1 \leq \gamma_2 \leq \ldots \gamma_N$. Of course, the transmission rate targets in the first sequence $S_\gamma$ may also be arranged in non-increasing order. The scope of the present disclosure is not limited in this regard.

Upon determining the first sequence $S_\gamma$ of transmission rate targets, the sorter 150 may send the first sequence $S_\gamma$ to the transmitters $110_1$, $110_2$, ..., and $110_N$ in any appropriate manner.

At 220, the sorter 150 determines, for the plurality of communication links, values of non-linear combinations of the transmit powers and the normalized powers corresponding to the plurality of communication links respectively.

In some embodiments, a value of a non-linear combination of a normalized power and a transmit power includes a total sum of a reciprocal of a normalized power value and a reciprocal of a transmit power value corresponding to the same communication link, i.e.

$$\left\{ \frac{1}{I_n(t)} + \frac{1}{p_n(t)} \mid n = 1, 2, \ldots, N \right\}.$$

Of course, the non-linear combination of normalized power and transmit power may take any appropriate form, and the scope of the present disclosure is not limited in this regard.

At 230, the sorter 150 arranges values of a plurality of non-linear combinations corresponding to the plurality of links as a second sequence in a second order. For example, in embodiments where the transmission rate targets in the first sequence are arranged in non-decreasing order, the sorter 150 also arranges the values of the plurality of non-linear combinations corresponding to the plurality of links as the second sequence in non-decreasing order, e.g. $\left( \frac{1}{I_{i_1}(t)} + \frac{1}{p_{i_1}(t)} \right) \leq \left( \frac{1}{I_{i_2}(t)} + \frac{1}{p_{i_2}(t)} \right) \leq \ldots \leq \left( \frac{1}{I_{i_N}(t)} + \frac{1}{p_{i_N}(t)} \right).$ This implies, for m=1, 2, ..., N, $R_t(i_m) = m$ indicates a value of a non-linear combination corresponding to the link $i_m$ has a location sequence number of m in the second sequence.

At 240, the sorter 150 provides respective location sequence numbers of values of non-linear combinations in the second sequence to the transmitters of the plurality of links. For example, in embodiments where the value of the non-linear combination of normalized power and transmit power includes the total sum $$\left\{ \frac{1}{I_n(t)} + \frac{1}{p_n(t)} \mid n = 1, 2, \ldots, N \right\}$$

of the reciprocal of the normalized power value and the reciprocal of the transmit power value corresponding to the same link, the location sequence number of the value of the non-linear combination $$\left( \frac{1}{I_n(t)} + \frac{1}{p_n(t)} \right)$$

in the second sequence may be represented as $R_r(n)$, and the sorter 150 may send $R_r(n)$ to the transmitter $110_n$ (n=1, 2, . . . , N).

Thereby, under current transmit power of transmitters of the N communication links, the desired transmission rate assignment may be easily obtained according to rankings of values of non-linear combinations $$\left\{ \frac{1}{I_n(t)} + \frac{1}{p_n(t)} \mid n = 1, 2, \ldots, N \right\}$$

of the N communication links, so that exhaustive search over all possible transmission rate assignments is avoided.

After the transmitter $110_n$ receives the location sequence number $R_r(n)$, a value of a transmission rate target corresponding to the transmitter $110_n$ may be determined according to the first sequence $S_\gamma$ and the location sequence number $R_r(n)$. In turn, the transmitter $110_n$ may update transmit power of the transmitter $110_n$ at least based on the determined value of the transmission rate target.

In some embodiments, only some of the transmitters $110_1$, $110_2$, . . . , and $110_n$ are allowed to exchange their transmission rate targets, and others are not allowed to exchange their transmission rate targets. For example, it may be supposed that the transmitters $110_1$, $110_2$, . . . , and $110_{N'}$ are allowed to exchange their transmission rate targets $S'_\gamma = \{\gamma_1, \gamma_2, \ldots, \gamma_{N'}\}$ and the transmitters $110_{N'+1}, 110_{N'+2}, \ldots,$ and $110_N$ are associated with fixed transmission rate targets $\{\gamma_{N'+1}, \gamma_{N'+2}, \ldots, \gamma_N\}$.

In such embodiments, the sorter 150 may arrange values of $$\left\{ \frac{1}{I_n(t)} + \frac{1}{p_n(t)} \mid n = 1, 2, \ldots, N' \right\}$$

in a non-decreasing order to form a third sequence $$\left( \frac{1}{I_{i_1}(t)} + \frac{1}{p_{i_1}(t)} \right) \leq \left( \frac{1}{I_{i_2}(t)} + \frac{1}{p_{i_2}(t)} \right) \leq \ldots \leq \left( \frac{1}{I_{i_{N'}}(t)} + \frac{1}{p_{i_{N'}}(t)} \right).$$

This implies $R_r(i_m)=m$ for m=1, 2, . . . , N'. Further, the sorter 150 may send $R_r(n)$ to the transmitter $110_n$ (n=1, 2, . . . , N').

In some embodiments, acts in the method 200 may be performed iteratively until a convergence condition is met. For example, $|p_n(t+1)-p_n(t)| \leq \varepsilon$, wherein $\varepsilon \geq 0$.

According to the embodiments of the present disclosure, by arranging the values of the non-linear combinations in the first order and providing the location sequence numbers of the values of corresponding non-linear combinations in the second sequence to respective transmitters, the optimization of transmission rate assignment is integrated with the update of transmit power of the transmitters. Thereby, good backward compatibility with current wireless systems is ensured.

Since the change of transmission rate target assignments may be indicated by providing a corresponding location sequence number of a value of a non-linear combination to the transmitter, signaling overhead is saved.

In addition, according to the embodiments of the present disclosure, improvement is made to the transmission rate by exchanging the individual transmission rates among the plurality of communication links.

As the communication method for joint optimization of transmit power and transmission rate implemented at the sorter 150 has been described with reference to FIG. 2, description is presented below to a communication method 300 for joint optimization implemented at the transmitter of a communication link with reference to FIG. 3.

Figure 3:
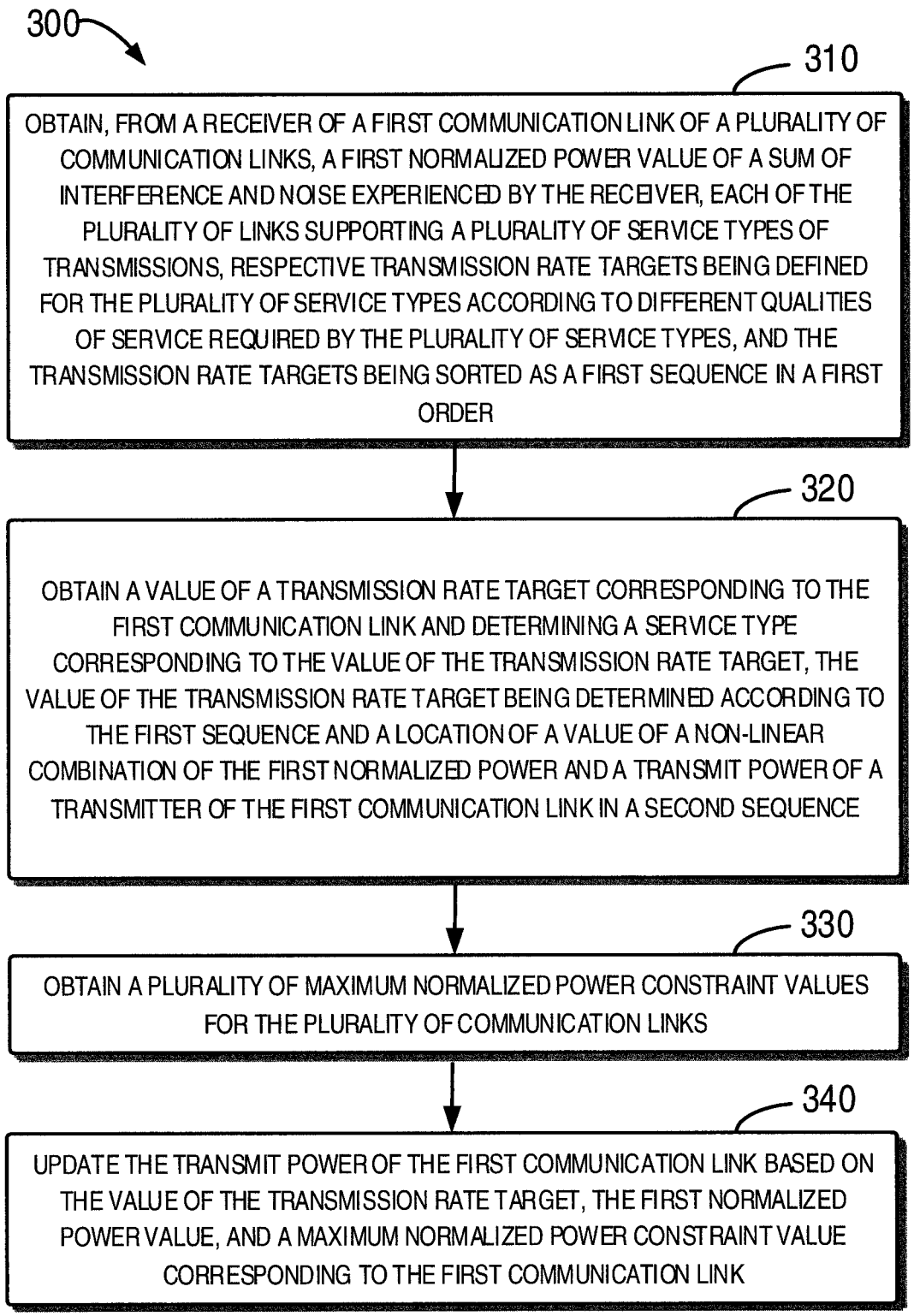
FIG. 3 shows a flowchart of a communication method according to some embodiments of the present disclosure.

FIG. 3 shows a flowchart of the communication method 300 according to some embodiments of the present disclosure. In some embodiments, the method 300 may be executed by any of the transmitters $110_1, 110_2, \ldots,$ and $110_N$ in FIG. 1 for example. It will be appreciated that the method 300 may further include additional acts that are not shown and/or may omit acts that are shown. The scope of the embodiments of the present disclosure is not limited in this regard. For the discussion purpose, the method 300 will be illustrated mainly by taking the transmitter $110_1$ as example. Nevertheless, it should be appreciated that the transmitters $110_1, 110_2, \ldots,$ and $110_N$ each may operate as the transmitter $110_1$.

At 310, the transmitter $110_1$ receives, from a receiver $120_1$ of a first communication link among a plurality of communication links, a first normalized power value of a sum of interference and noise experienced by the receiver $120_1$. Like the method 200 described above with reference to FIG. 2, in some embodiments, the receiver $120_1$ may determine the first normalized power value $I_1(t)$ of the sum of interference and noise based on the above Equation (5).

Each of the plurality of communication links can support multiple service types of transmissions. Respective transmission rate targets are defined for the multiple service types according to different qualities of service required by the multiple service types. The plurality of transmission rate targets are sorted as a first sequence in a first order. For the discussion purpose, the first sequence $S_\gamma = \{\gamma_1, \gamma_2, \ldots, \gamma_N\}$ described above with reference to FIG. 2 is taken as example.

At 320, the transmitter $110_1$ obtains a value of a transmission rate target corresponding to the first communication link and determines a service type corresponding to the value of the transmission rate target. The value of the transmission rate target is determined according to the first sequence and a location of a value of a non-linear combination of the first normalized power and a transmit power of a transmitter of the first communication link in a second sequence. The second sequence is obtained by arranging values of a plurality of non-linear combinations corresponding to the following of the plurality of communication links in the first order: normalized power values of sums of interference and noise experienced by receivers of the plurality of communication links, and transmit power values of transmitters of the plurality of communication links.

In some embodiments, the value of the non-linear combination of the foregoing two items includes a sum of a reciprocal of the normalized power value and a reciprocal of the transmit power value, i.e.

$$\left\{ \frac{1}{I_n(t)} + \frac{1}{p_n(t)} \mid n = 1, 2, \ldots, N \right\}.$$

Of course, the non-linear combination of normalized power and transmit power may take any appropriate form, and the scope of the present disclosure is not limited in this regard.

In embodiments where the second sequence is formed by the sorter 150, the transmitter 110₁ may obtain from the sorter 150 a location sequence number of the value of the non-linear combination of the foregoing two items in the second sequence.

As described above, the sorter 150 may arrange $$\left\{ \frac{1}{I_n(t)} + \frac{1}{p_n(t)} \mid n = 1, 2, \ldots, N' \right\}$$

in non-decreasing order to form a second sequence $$\left( \frac{1}{I_{i_1}(t)} + \frac{1}{p_{i_1}(t)} \right) \leq \left( \frac{1}{I_{i_2}(t)} + \frac{1}{p_{i_2}(t)} \right) \leq \ldots \leq \left( \frac{1}{I_{i_N}(t)} + \frac{1}{p_{i_N}(t)} \right).$$

This implies $R_t(i_m) = m$ for $m=1, 2, \ldots, N$. In this view, the transmitter 110₁ may obtain from the sorter 150 the location sequence number $R_t(1)$ of the value of the non-linear combination of the foregoing two items in the second sequence.

At 330, the transmitter 110₁ obtains a plurality of maximum normalized power constraint values for the plurality of communication links. In other words, for each communication link among the plurality of communication links, one or more normalized power constraint values are obtained, and a maximum is found through comparison. In some embodiments, the maximum normalized power constraint value is determined by a power calculator 160 in FIG. 1. In this regard, the transmitter 110₁ may obtain from the power calculator 160 maximum normalized power constraint values for the plurality of communication links.

At 340, the transmitter 110₁ updates the transmit power of the first communication link based on the value of the transmission rate target, the first normalized power value and the maximum normalized power constraint value corresponding to the first communication link.

In some embodiments, the transmitter 110₁ may update the transmit power of the first communication link as a first transmit power value based on the value of the transmission rate target corresponding to the first communication link and the first normalized power value and further update the transmit power as a second transmit power value based on the maximum normalized power constraint value.

In some embodiments, the transmitter 110₁ may update the transmit power of the first communication link as the first transmit power value based on an equation below:

$$p'_n(t+1) = 2^{\gamma R_t(n)} \frac{I_n(t) p_n(t)}{I_n(t) + p_n(t)}, n = 1, 2, \ldots, N \quad (6)$$

where $p'_n(t+1)$ represents the first transmit power value of the nth communication link among the plurality of communication link at time t+1, $\gamma_{R_t(n)}$ represents the transmission rate target of the nth communication link at time t+1, $I_n(t)$ represents the first normalized power value of the nth communication link at time t+1, $p_n(t)$ represents a transmit power of the nth communication link at time t+1, t is an arbitrary integer that is greater than or equal to 0, and N is an arbitrary integer that is greater than or equal to 2.

In some embodiments, the transmitter 110₁ may update the transmit power as the second transmit power value based on the maximum normalized power constraint value according to an equation below:

$$p_n(t+1) = \frac{p'_n(t+1)}{\overline{P}}, n = 1, 2, \ldots, N \quad (7)$$

where $p_n(t+1)$ represents a second transmit power of a transmitter of the communication link n among the plurality of communication link at time t+1, $p'_n(t+1)$ represents a first transmit power value of the communication link n among the plurality of communication link at time t+1, and $\overline{P}$ represents a maximum normalized power constraint value.

In some embodiments, the power calculator 160 may determine the maximum normalized power constraint value based on an equation below:

$$\overline{P} = \max_{m=1,2,\ldots,M} \frac{1}{\overline{P}_m} \sum_{n=1}^{N} w_{mn} p'_n(t+1) \quad (8)$$

where $\overline{P}$ represents the maximum normalized power constraint value, M represents the number of power constraints and $M \geq 1$, $w_{mn}$ represents a weight of the power constraint and $w_{mn} \geq 0$, and $\overline{P}_m$ represents a power upper-limit value corresponding to the power constraint condition m.

As seen from Equation (8), in order to determine the maximum normalized power constraint value, the power calculator 160 needs to obtain from the transmitters 110₁, 110₂, ..., and 110ₙ their respective first transmit power values $p'_n(t+1)$ at time t+1.

It will be appreciated that determining the transmit power value in light of Equations (6) and (7) is merely exemplary and it is not intended to limit the scope of the present disclosure. As a matter of fact, the transmitter may determine its transmit power value in any appropriate manner, and the scope of the present disclosure is not limited in this regard.

As described above, in some embodiments, only some of the transmitters 110₁, 110₂, ..., and 110ₙ are allowed to exchange their transmission rate targets, while the others are not allowed. For example, it may be supposed that the transmitters 110₁, 110₂, ..., and 110_{N'} are allowed to exchange their transmission rate targets $S'_\gamma = \{\gamma_1, \gamma_2, \ldots, \gamma_{N'}\}$, and the transmitters 110_{N'+1}, 110_{N'+2}, ..., and 110ₙ are associated with fixed transmission rate targets $\{\gamma_{N'+1}, \gamma_{N'+2}, \ldots, \gamma_N\}$. In such embodiments, the transmitters 110₁, 110₂, ..., and 110ₙ may calculate their first transmit power $p'_n(t+1)$ based on an equation as below:

$$p'_n(t+1) = \begin{cases} 2^{\gamma R_t(n)} \dfrac{I_n(t)p_n(t)}{I_n(t)+p_n(t)}, & n = 1, 2, \ldots, N' \\ 2^{\gamma_n} \dfrac{I_n(t)p_n(t)}{I_n(t)+p_n(t)} & n = N'+1, N'+2, \ldots, N \end{cases} \quad (9)$$

Upon determining the first transmit power value p'$_n$(t+1), the transmitter 110$_1$, 110$_2$, ..., 110$_N$ may further update the transmit power as the second transmit power value based on the maximum normalized power constraint value.

In some embodiments, operations in the method 300 may be executed iteratively until a convergence condition is met. For example, |p$_n$(t+1)−p$_n$(t)|≤ε, wherein ε≥0.

It will be appreciated that various features described above with reference to FIG. 2 are also applicable to the method 300 and thus are not detailed here.

Firstly, the method according to the embodiments of the present disclosure avoids exhaustive search over all possible rate assignments and hence can serve as an intelligent algorithm for solving the foregoing mixed-integer nonlinear programming problem (P2). According to the embodiments of the present disclosure, transmission rate gain brought by the rate assignment is ensured during iterations. At each iteration, a currently optimum rate assignment is selected from all rate assignments, so that the updated transmit power cost is minimized. Hence, the power utilization efficiency is improved, and the transmission rate gain is produced.

A satisfactory rate assignment amounts to the solution of a linear sum assignment problem whose cost matrix fulfills the Monge property. Consequently, the desired rate assignment can be readily picked up just depending on the location sequence number of the sum, i.e.

$$\left\{ \dfrac{1}{I_n(t)} + \dfrac{1}{p_n(t)} \mid n = 1, 2, \ldots, N' \right\}$$

of the reciprocals of the transmit power values and the reciprocals of the normalized power values of interference and noise experienced by the transmitters of all communication links under the current transmit powers in the second sequence. The transmitters can track the desired rate assignment only by obtaining the location sequence number of the sum of corresponding reciprocals in the second sequence, and further can update their respective transmit powers in parallel by tracking the desired rate assignment.

The communication method according to the embodiments of the present disclosure has been described in detail with reference to FIGS. 2 and 3. Now, description is presented to an apparatus according to the embodiments of the present disclosure with reference to FIGS. 4 to 6.

Figure 4:
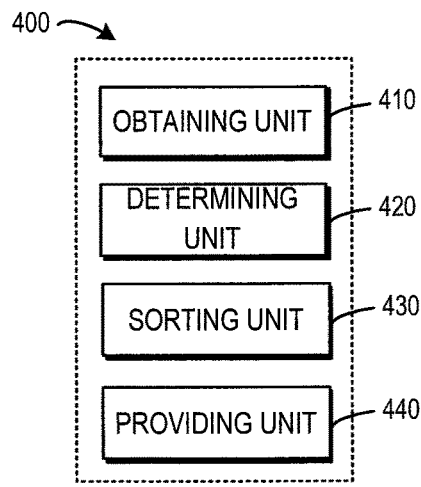
FIG. 4 shows a block diagram of an apparatus implemented at a network device according to some embodiments of the present disclosure.

FIG. 4 shows a block diagram of an apparatus 400 according to some embodiments of the present disclosure. It will be appreciated that the apparatus 400 may be implemented at the sorter 150 side shown in FIG. 1. In embodiments where the sorter 150 is implemented at the network device side, the apparatus 400 may be implemented at the network device. In an embodiment where the sorter 150 is implemented at the terminal device side, the apparatus 400 may be implemented at the terminal device.

As shown in FIG. 4, the apparatus 400 comprises: an obtaining unit 410, a determining unit 420, a sorting unit 430 and a providing unit 440.

The obtaining unit 410 is configured to obtain, from receivers of a plurality of communication links, respective normalized power values of sums of interference and noise experienced by the receivers and transmit power values of transmitters of the plurality of communication links. Each of the plurality of links is capable of supporting multiple service types of transmissions, respective transmission rate targets is defined for the multiple service types according to different qualities of service required by the multiple service types, and the transmission rate targets is sorted as a first sequence in a first order.

The determining unit 420 is configured to determine, for the plurality of communication links, values of non-linear combinations of the transmit powers and the normalized powers corresponding to the plurality of communication links respectively. The sorting unit 430 is configured to arrange values of a plurality of non-linear combinations corresponding to the plurality of links as a second sequence in the first order. The providing unit 440 is configured to provide the transmitters of the plurality of communication links with location sequence numbers of the values of the non-linear combinations in the second sequence.

In some embodiments, the values of non-linear combinations of the transmit powers and the normalized powers each comprise a sum of a reciprocal of a normalized power value and a reciprocal of a transmit power value corresponding to the same communication link of the plurality of communication links.

Figure 5:
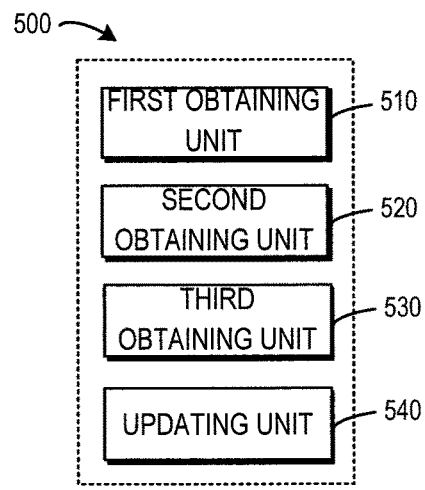
FIG. 5 shows a block diagram of an apparatus implemented at a terminal device according to some embodiments of the present disclosure.

FIG. 5 shows a block diagram of an apparatus 500 according to some embodiments of the present disclosure. It will be appreciated that the apparatus 500 may be implemented at any of the transmitters 110$_1$, 110$_2$, ..., and 110$_N$ shown in FIG. 1. In embodiments where the transmitter is implemented at the network device side, the apparatus 500 may be implemented at the network device. In embodiments where the transmitter is implemented at the terminal device, the apparatus 500 may be implemented as the terminal device.

As shown in FIG. 5, the apparatus 500 comprises: a first obtaining unit 510, a second obtaining unit 520, a third obtaining unit 530 and an updating unit 540.

The first obtaining unit 510 is configured to obtain, from a receiver of a first communication link of a plurality of communication links, a first normalized power value of a sum of interference and noise experienced by the receiver. Each of the plurality of links is capable of supporting multiple service types of transmissions, respective transmission rate targets is defined for the multiple service types according to different qualities of service required by the multiple service types, and the transmission rate targets is sorted as a first sequence in a first order.

The second obtaining unit 520 is configured to obtain a value of a transmission rate target corresponding to the first communication link and determine a service type corresponding to the value of the transmission rate target. The value of the transmission rate target is determined according to the first sequence and a location of a value of a non-linear combination of the first normalized power and a transmit power of a transmitter of the first communication link in a second sequence. The second sequence is obtained by arranging values of a plurality of non-linear combinations corresponding to the following of the plurality of communication links in the first order: normalized power values of sums of interference and noise experienced by receivers of the plurality of communication links, and transmit power values of transmitters of the plurality of communication links.

The third obtaining unit 530 is configured to obtain a plurality of maximum normalized power constraint values for the plurality of communication links. The updating unit 540 is configured to update the transmit power of the first communication link based on a value of a transmission rate target, the first normalized power value and a maximum normalized power constraint value corresponding to the first communication link.

In some embodiments, the value of the non-linear combination of the first normalized power and the transmit power comprises a sum of a reciprocal of a normalized power value and a reciprocal of a transmit power value.

In some embodiments, the updating unit 540 is further configured to: update the transmit power of the first communication link as a first transmit power value based on the transmission rate target and the first normalized power value of the first communication link; and update the transmit power of the first communication link as a second transmit power value based on the maximum normalized power constraint value and the first transmit power value.

In some embodiments, the updating unit 540 is further configured to update the transmit power of the first communication link as the first transmit power value based on an equation:

$$p'_n(t+1) = 2^{\gamma_{R_t(n)}} \frac{I_n(t)p_n(t)}{I_n(t) + p_n(t)}, n = 1, 2, \ldots, N$$

where $p'_n(t+1)$ represents the first transmit power value of the $n^{th}$ communication link among the plurality of communication link at time t+1, $\gamma_{R_t(n)}$ represents the transmission rate target of the $n^{th}$ communication link at time t+1, $I_n(t)$ represents the first normalized power value of the $n^{th}$ communication link at time t+1, $p_n(t)$ represents a transmit power of the $n^{th}$ communication link at time t+1, t is an arbitrary integer that is greater than or equal to 0, and N is an arbitrary integer that is greater than or equal to 2.

In some embodiments, the updating unit 540 is further configured to update the first transmit power value as the second transmit power value based on an equation:

$$p_n(t+1) = \frac{p'_n(t+1)}{\overline{P}}, n = 1, 2, \ldots, N$$

where $p_n(t+1)$ represents the second transmit power value of the $n^{th}$ communication link among the plurality of communication links at the time t+1, and $\overline{P}$ represents the maximum normalized power constraint value.

In some embodiments, the maximum normalized power constraint value is determined based on an equation:

$$\overline{P} = \max_{m=1,2,\ldots,M} \frac{1}{\overline{P}_m} \sum_{n=1}^{N} w_{mn} p'_n(t+1)$$

where M represents the number of power constraints and M≥1, $w_{mn}$ represents weights of the power constraints and $w_{mn} \geq 0$, and $\overline{P}_m$ represents a power upper-limit value corresponding to the $m^{th}$ power constraint among the power constraints.

It should be understood each unit of the apparatuses 400 and 500 corresponds to each act of the methods 200 and 300 described with reference to FIGS. 2 and 3 respectively. Therefore, operations and features described above with reference to FIGS. 2 to 5 are also applicable to the apparatuses 400 and 500 as well as units included in them, and meanwhile have the same effect, details of which are ignored here.

The units included in the apparatuses 400 and 500 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 400 and 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The units shown in FIGS. 4 and 5 may be implemented, partially or entirely, as hardware modules, software modules, firmware modules or any combination thereof. In particular, in some embodiments, the flows, methods or processes described above may be implemented by hardware in a base station or terminal device. For example, the base station or terminal device may implement the methods 200 and 300 by means of its transmitter, receiver, transceiver and/or processor.

Figure 6:
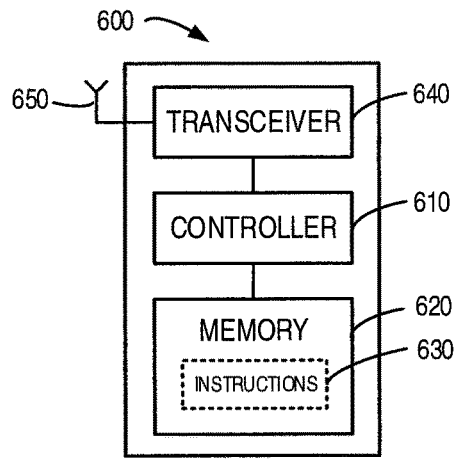
FIG. 6 shows a block diagram of a communication device which is applicable to implement some embodiments of the present disclosure.

FIG. 6 shows a block diagram of a device 600 which is applicable to implement the embodiments of the present disclosure. The device 600 may be used for implementing a network device or a network device.

As depicted, the device 600 comprises a controller 610. The controller 610 controls operations and functions of the device 600. For example, in some embodiments, the controller 610 may execute various operations by means of instructions 630 stored in a memory 620 coupled to the controller 610. The memory 620 may be of any appropriate type that is applicable to a local technical environment, and may be implemented using any appropriate data storage techniques, including without limitation to, semiconductor based memory devices, magnetic memory devices and systems, optical memory devices and systems. Though only one memory unit is shown in FIG. 6, there may be a plurality of physically different memory units in the device 600.

The controller 610 may be of any appropriate type that is applicable to a local technical environment, and may include without limitation to, a general-purpose computer, a special-purpose computer, a microprocessor, a digital signal processor (DSP), as well as one or more processors in a processor based multi-core processor architecture. The device 600 may also comprise a plurality of controllers 610. The controller 610 is coupled to a transceiver 640 that may effect information receiving and transmitting by means of one or more antennas 650 and/or other component. Note in the context of the present disclosure, the transceiver 640 may be a device capable of simultaneously performing data sending and receiving functions or may be a device only having a data sending or receiving function.

When the device 600 acts as a network device, the controller 610 and the transceiver 640 may operate in cooperation to implement the methods 200 and 300 described with reference to FIGS. 2 and 3. When the device 600 acts as a terminal device, the controller 610 and the transceiver 640 may operate in cooperation to implement the methods 200 and 300 described with reference to FIGS. 2 and 3. For example, in some embodiments, all the above-described actions relating to data/information transmitting and receiving may be executed by the transceiver 640, while other actions may be executed by the controller 610. All features described with reference to FIGS. 1 to 5 are applicable to the device 600, which is ignored here.

Figure 7:
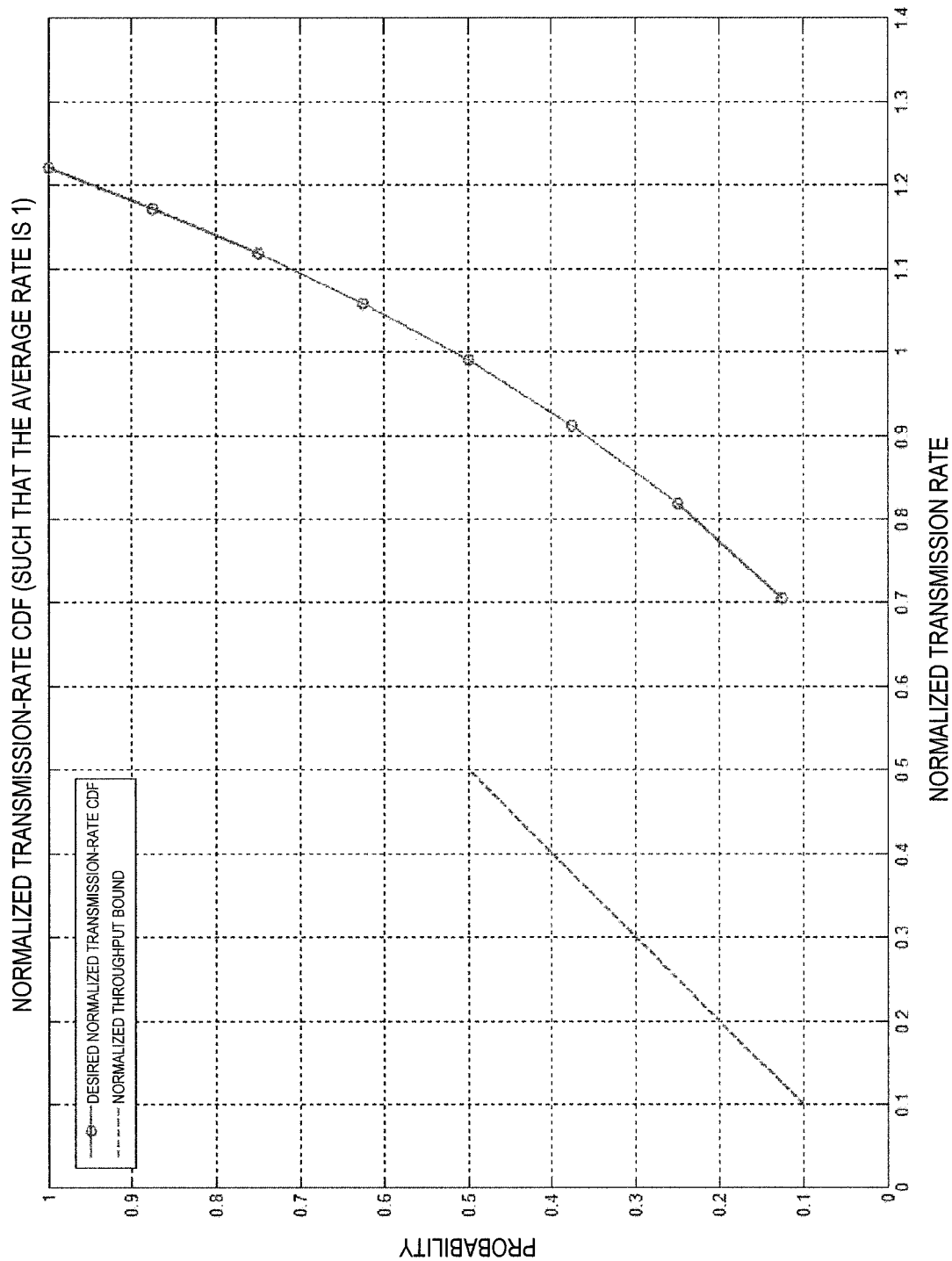
FIG. 7 shows a schematic view of the desired normalized transmission rate CDF according to the embodiments of the present disclosure.

FIG. 7 shows a schematic view of desired CDF of normalized user transmission rate according to the embodiments of the present disclosure. The solution of the present disclosure is evaluated in terms of throughput and convergence rate, wherein a communication network consisting of eight communication links is simulated. Table 1 shows the matrix of channel gain $\{G_{mn}\}$.

TABLE 1

Matrix of Channel Gain (8 × 8)

| | | | | | | | |
|---|---|---|---|---|---|---|---|
| 1.3774323 5549920e−09 | 8.4189868 4194568e−08 | 1.5357461 7266426e−08 | 1.1622458 9656660e−09 | 1.3725164 9708510e−09 | 8.5411740 5167408e−08 | 2.3136984 1518835e−08 | 3.2249706 3676564e−09 |
| 3.6073656 0897660e−09 | 2.3023016 0879580e−08 | 4.1492968 8608175e−11 | 3.8380320 1299795e−11 | 2.0363386 3933387e−07 | 4.3011739 5772998e−08 | 3.2948006 7245686e−10 | 3.1020279 6694232e−09 |
| 1.7393743 9527428e−10 | 2.1579586 4030339e−09 | 8.0761500 6141771e−07 | 5.6790466 4792682e−08 | 5.6443033 1759815e−11 | 4.2249640 1365870e−09 | 1.7487774 4685945e−08 | 6.4308758 3293891e−10 |
| 1.1857592 2136206e−09 | 1.5830701 7098643e−09 | 2.4679166 7879707e−08 | 2.6200770 2874651e−07 | 1.1594539 8466017e−10 | 1.0034160 7605112e−09 | 7.4209643 5258519e−08 | 4.2410430 8043685e−08 |
| 2.4926084 8948694e−09 | 1.3244458 7671931e−09 | 2.9506497 8814982e−09 | 4.1183689 4997452e−10 | 9.2036912 1584832e−09 | 6.9151762 0150566e−08 | 5.3570392 7959099e−08 | 1.5119144 9638401e−08 |
| 1.6009225 0999693e−10 | 4.6552003 0060506e−09 | 8.9355856 5516705e−09 | 5.9195440 6092573e−09 | 2.4077853 6406245e−10 | 3.7645243 3187030e−09 | 1.4055215 9954818e−08 | 2.3194991 2431469e−09 |
| 4.9402856 3638147e−11 | 1.4452266 7550496e−09 | 4.0192937 8222595e−08 | 2.1665741 3066142e−09 | 4.5648960 3147256e−09 | 7.2622885 3105837e−09 | 2.5869299 1711087e−07 | 2.6728053 8643694e−08 |
| 2.4831656 7977575e−08 | 2.1740658 3459346e−07 | 3.1569248 6648446e−07 | 3.1172076 6898746e−07 | 3.3911457 4545183e−11 | 2.8942224 0184792e−07 | 3.6570408 9544053e−08 | 6.9258663 2442981e−09 |

Joint power control and rate assignment is performed to the rate sequence shown in Table 2 below.

TABLE 2

| $\gamma_1$ | $\gamma_2$ | $\gamma_3$ | $\gamma_4$ | $\gamma_5$ | $\gamma_6$ | $\gamma_7$ | $\gamma_8$ |
|---|---|---|---|---|---|---|---|
| 1.221037 08428811 | 1.1725039 9555341 | 1.1188531 5504452 | 1.0588766 1809233 | 0.9908808 28551071 | 0.9123854 50219704 | 0.8195451 22855966 | 0.7059 177453 94887 |

The sequence $S_\gamma = \{\gamma_1, \gamma_2, \ldots, \gamma_{N'}\}$ of transmission rate targets is selected to construct the empirical CDF of normalized user transmission rate as the desired normalized user transmission rate CDF shown in FIG. 7.

Figure 8:
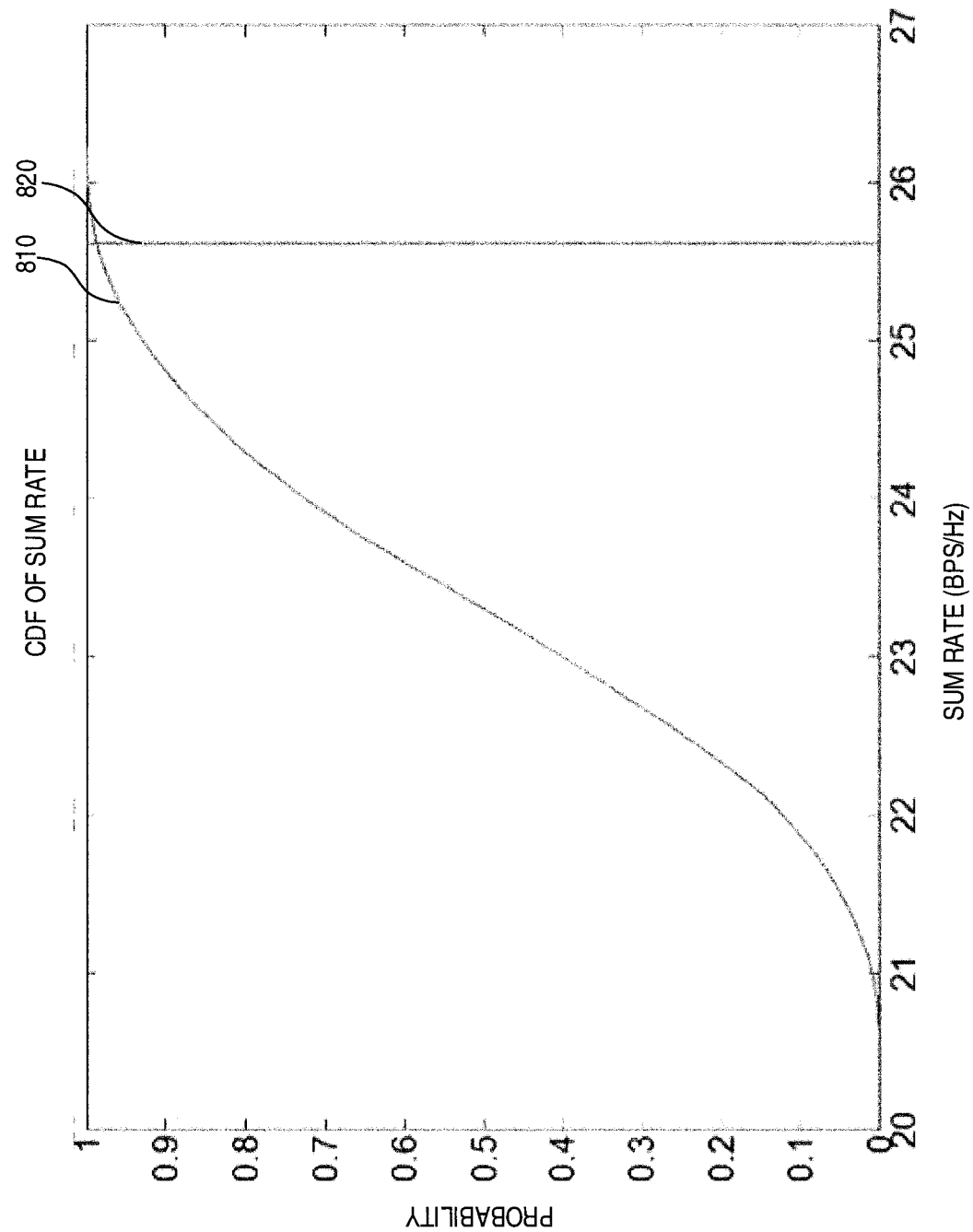
FIGS. 8 and 9 each show a schematic view of a simulation performance comparison according to a method of the present disclosure.
Figure 9:
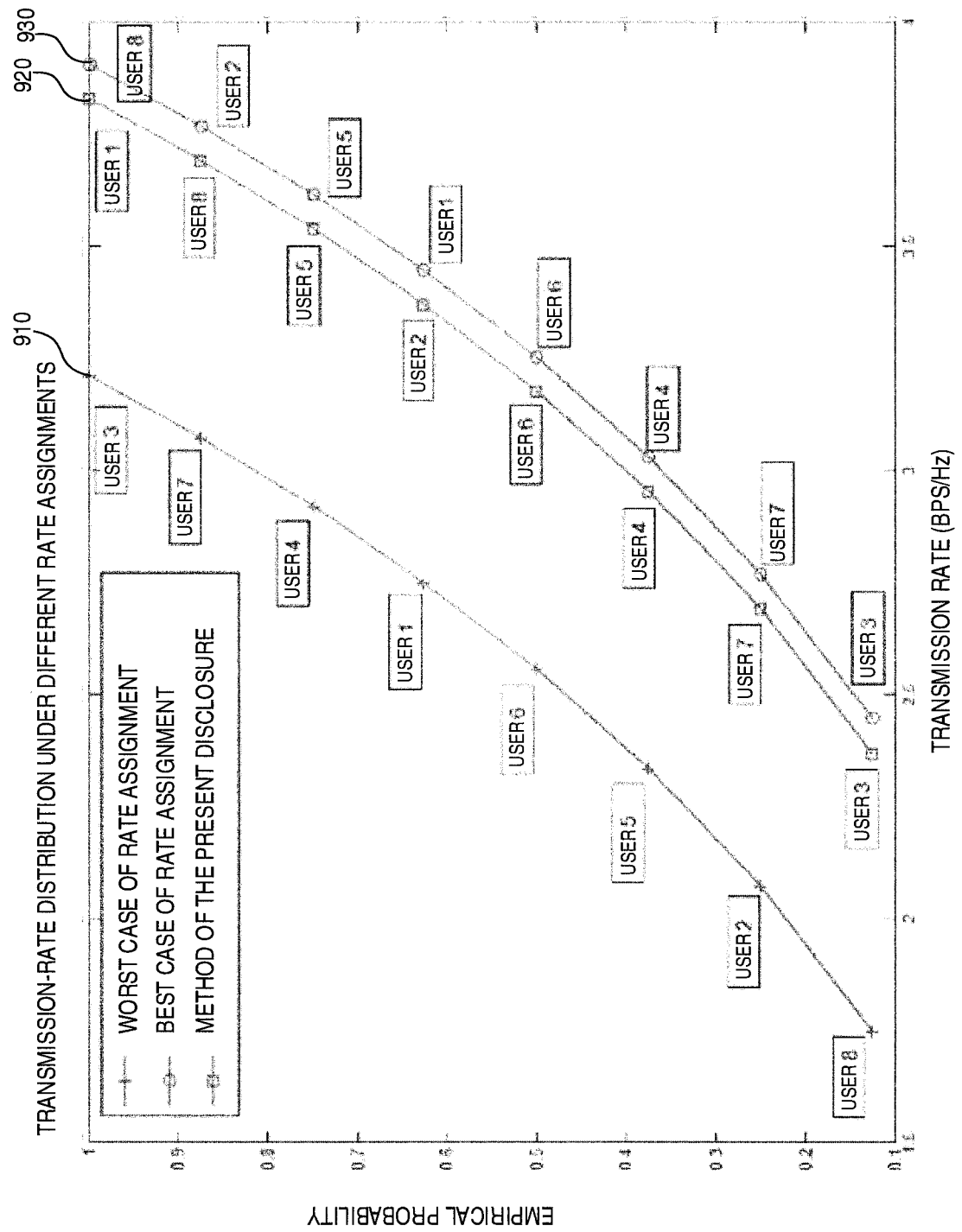

FIGS. 8 and 9 each show a schematic view of simulation performance comparison of the method according to the present disclosure. In FIG. 8, a curve 810 depicts the real distribution of sum rate out all 8!=40320 rate assignments. A curve 820 depicts empirical CDF of a calculation result of the method, which is generated by repeating the solution of the present disclosure 1000,000 times, each with a different and random initialization value. As seen from the curve 810, the significant potential improvement is achieved through rate assignment, and around bps/Hz gain in sum rate is obtained. FIG. 8 demonstrates the stability and convergence of the method of the present disclosure, wherein the method converges to a stable point with 100% probability.

As shown in FIG. 8, the method of the present disclosure approaches to the global optimal solution of joint power control and rate assignment, and the achieved performance is better than 95% rate assignments. This is comparative to the resultant performance after searching over 8!*95%=38304 rate assignments with brute force. FIG. 8 shows the performance comparison in terms of transmission rate. As observed from FIG. 8, the method of the present disclosure can achieve the same normalized user transmission rate CDF as the desired CDF and obtain the substantial rate improvement.

In FIG. 9, a curve 910 depicts the worst case of rate assignment, a curve 920 depicts an iterative method according to the embodiments of the present disclosure, and a curve 930 depicts the best case of rate assignment. The iterative method according to the embodiments of the present disclosure can serve as an intelligent algorithm for mixed-integer nonlinear programming problem (P2), avoiding the exhaustive search. As seen from FIG. 9, the iterative procedure is stable, which can converge to a near-optimal solution with very low computational complexity (as shown by 920).

A desired rate assignment can be easily chosen by exploiting the Monge property of the linear sum assignment problem, just depending on the order of sums $$\left\{\frac{1}{I_n(t)} + \frac{1}{p_n(t)} \mid n = 1, 2, \ldots, N\right\}$$

of the reciprocals of normalized power values and transmit power values under the current transmit powers of transmitters of the N communication links.

The method of the present disclosure brings rate improvement just by exchanging the individual transmission rate targets among respective communication links. As for the network-side utility, it can maintain the same normalized transmission-rate CDF determined by the sequence of transmission rate targets in advance.

In addition, the method of the present disclosure integrates the functionality of sorting with the conventional distributed power control method, ensuring good backward compatibility with current wireless communication systems. The power updating procedure as adopted is well compatible with the distributed power standardization control mechanism that has been widely applied in the current wireless communication systems. Furthermore, the practical implementation of the method of the present disclosure just involves local measurements of interference that are familiar to the commercial communication systems.

Figure 10:
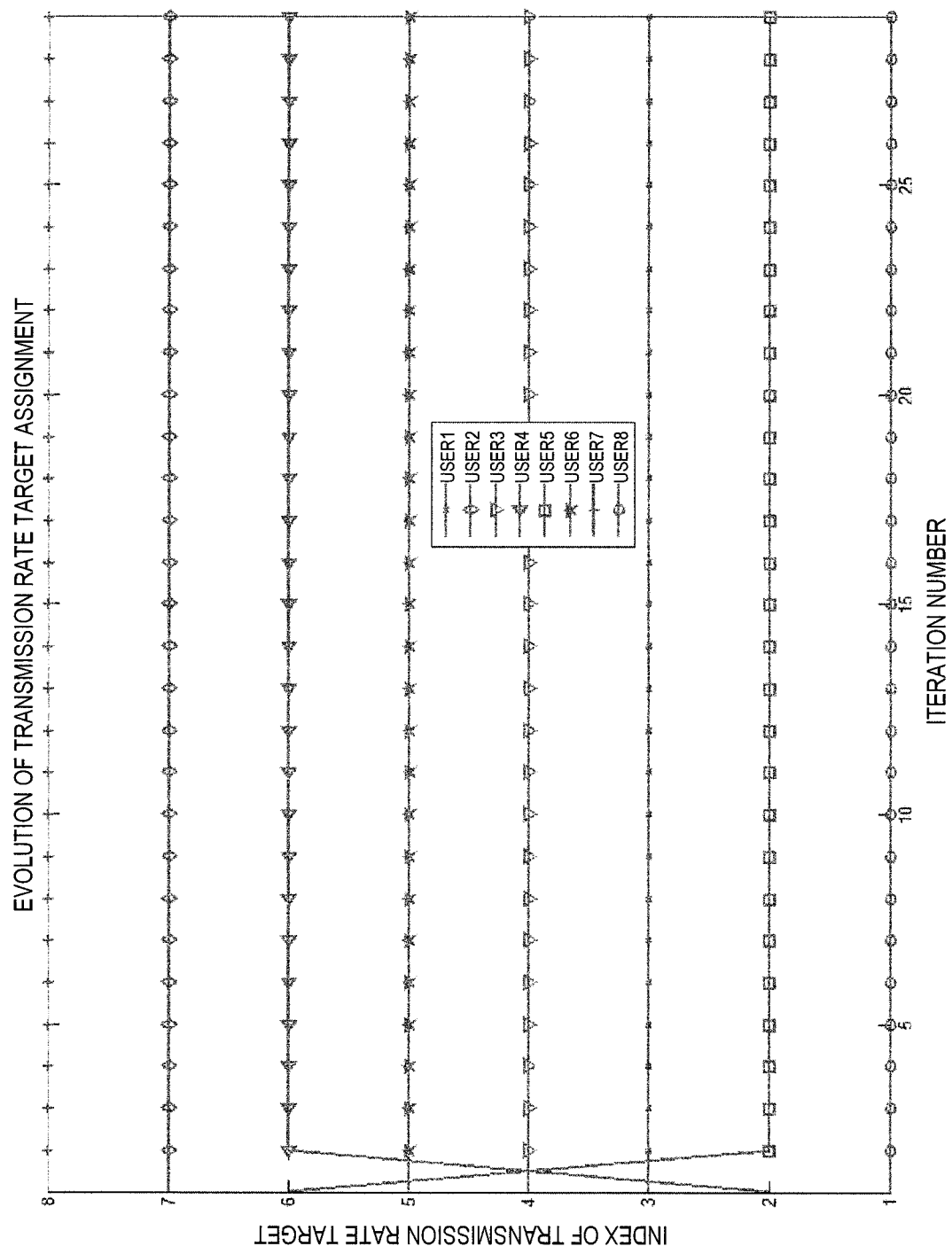
FIG. 10 shows a schematic view of the evolution of rate assignment of converging to a stable point according to a method of the present disclosure.
Figure 11:
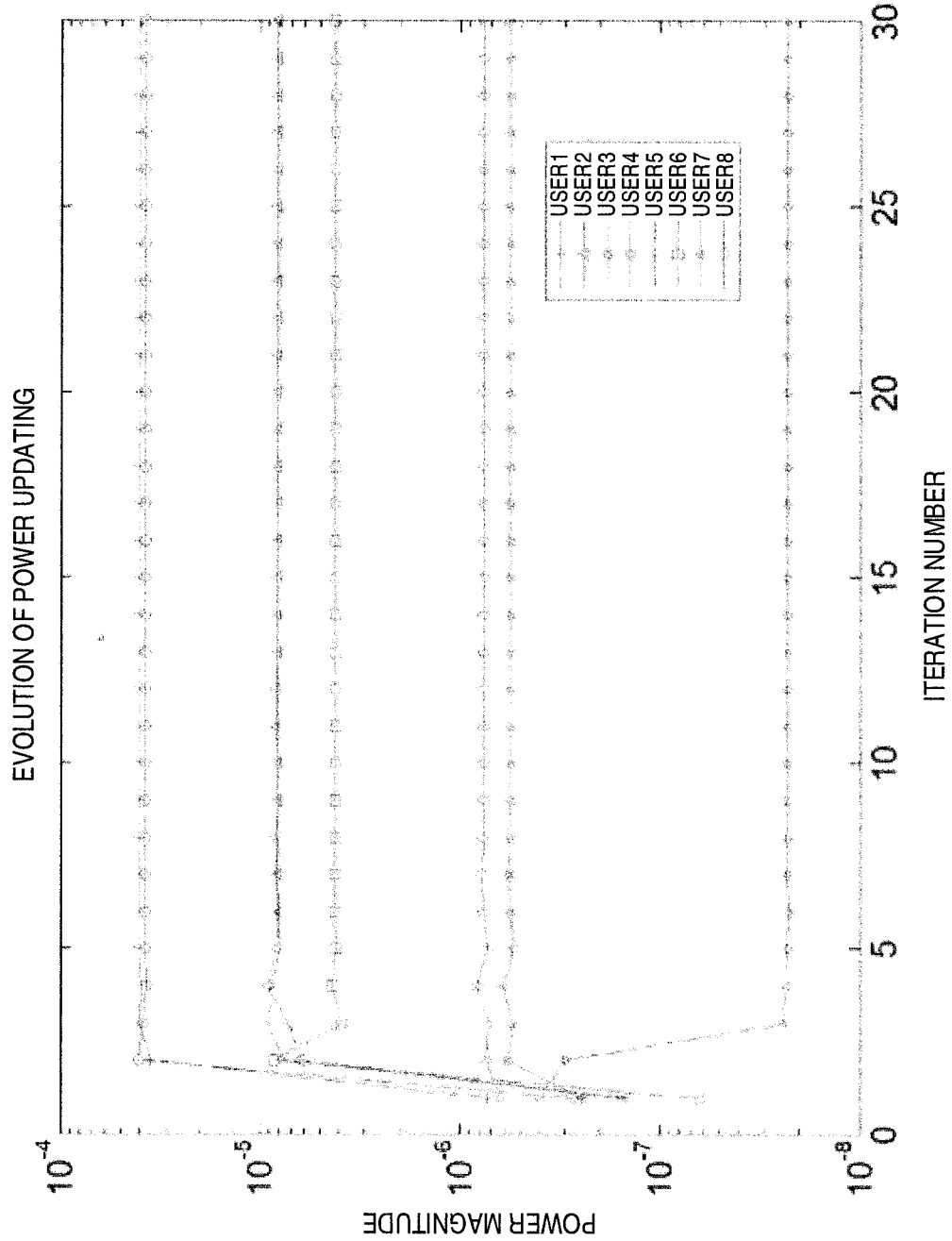
FIG. 11 shows a schematic view of the evolution of power updating of converging to a stable point according to a method of the present disclosure.

FIG. 10 shows a schematic view of the evolution of converging to a stable rate assignment state of the method according to the present disclosure. FIG. 11 shows a schematic view of the evolution of converging to a stable power update state of the method according to the present disclosure. As seen from FIGS. 10 and 11, the method according to the present disclosure can fast converge to a stable point.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in a plurality of embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

We claim:

1. A communication method, comprising:
obtaining, from receivers of a plurality of communication links, respective normalized power values of sums of interference and noise experienced by the receivers and transmit power values of transmitters of the plurality of communication links, each of the plurality of links supporting a plurality of service types of transmissions, respective transmission rate targets being defined for the plurality of service types according to different qualities of service required by the plurality of service types, and the transmission rate targets being sorted as a first sequence in a first order;
determining, for the plurality of links, values of non-linear combinations of the transmit powers and the normalized powers corresponding to the plurality of links respectively;
arranging the values of the non-linear combinations corresponding to the plurality of links as a second sequence in the first order; and
providing the transmitters of the plurality of links with location sequence numbers of the values of the non-linear combinations in the second sequence.

2. The method according to claim 1, wherein the values of non-linear combinations of the transmit powers and the normalized powers each comprise a sum of a reciprocal of a normalized power value and a reciprocal of a transmit power value corresponding to a same communication link of the plurality of communication links.

3. A communication method, comprising:
obtaining, from a receiver of a first communication link of a plurality of communication links, a first normalized power value of a sum of interference and noise experienced by the receiver, each of the plurality of links supporting a plurality of service types of transmissions, respective transmission rate targets being defined for the plurality of service types according to different qualities of service required by the plurality of service types, and the transmission rate targets being sorted as a first sequence in a first order;
obtaining a value of a transmission rate target corresponding to the first communication link and determining a service type corresponding to the value of the transmission rate target, the value of the transmission rate target being determined according to the first sequence and a location of a value of a non-linear combination of the first normalized power and a transmit power of a transmitter of the first communication link in a second sequence, the second sequence being obtained by arranging values of a plurality of non-linear combinations corresponding to the following of the plurality of communication links in the first order: normalized power values of sums of interference and noise experienced by receivers of the plurality of communication links, and transmit power values of transmitters of the plurality of communication links;
obtaining a plurality of maximum normalized power constraint values for the plurality of communication links; and
updating the transmit power of the first communication link based on the value of the transmission rate target, the first normalized power value, and a maximum normalized power constraint value corresponding to the first communication link.

4. The method according to claim 3, wherein the value of the non-linear combination of the first normalized power and the transmit power comprises a sum of a reciprocal of a normalized power value and a reciprocal of a transmit power value.

5. The method according to claim 3, wherein updating the transmit power of the first communication link comprises:
updating the transmit power of the first communication link as a first transmit power value based on the transmission rate target and the first normalized power value of the first communication link; and
updating the transmit power of the first communication link as a second transmit power value based on the maximum normalized power constraint value and the first transmit power value.

6. The method according to claim 5, wherein updating the transmit power of the first communication link as the first transmit power value comprises updating the transmit power of the first communication link as the first transmit power value based on an equation:

$$p'_n(t+1) = 2^{\gamma_{R_t(n)}} \frac{I_n(t)p_n(t)}{I_n(t)+p_n(t)}, n = 1, 2, \ldots, N$$

where $p'_n(t+1)$ represents the first transmit power value of a nth communication link among the plurality of communication link at a time t+1, $\gamma_{R_t(n)}$ represents the transmission rate target of the nth communication link at a time t+1, $I_n(t)$ represents the first normalized power value of the nth communication link at a time t+1, $p_n(t)$ represents a transmit power of the nth communication link at a time t+1, t is an arbitrary integer that is greater than or equal to 0, and N is an arbitrary integer that is greater than or equal to 2.

7. The method according to claim 5, wherein updating the transmit power of the first communication link as the second transmit power value based on the maximum normalized power constraint value and the first transmit power value comprises updating the transmit power value as the second transmit power value based on an equation:

$$p_n(t+1) = \frac{p'_n(t+1)}{\overline{P}}, n = 1, 2, \ldots, N$$

where $p_n(t+1)$ represents the second transmit power value of a nth communication link among the plurality of communication links at a time t+1, and $\overline{P}$ represents the maximum normalized power constraint value.

8. The method according to claim 7, wherein the maximum normalized power constraint value is determined based on an equation:

$$\overline{P} = \max_{m=1,2,\ldots,M} \frac{1}{\overline{P}_m} \sum_{n=1}^{N} w_{mn} p'_n(t+1)$$

where M represents the number of power constraints and M≥1, $W_{mn}$ represents weights of the power constraints, and $w_{mn} \geq 0$, and $\overline{P}_m$ represents a power upper-limit value corresponding to a mth power constraint among the power constraints.

9. A network device, comprising:
a controller; and
a memory coupled to the controller and having instructions stored thereon, the instructions, when executed by the controller, causing the network device to perform acts including:
obtaining, from receivers of a plurality of communication links, respective normalized power values of sums of interference and noise experienced by the receivers and transmit power values of transmitters of the plurality of communication links, each of the plurality of links supporting a plurality of service types of transmissions, respective transmission rate targets being defined for the plurality of service types according to different qualities of service required by the plurality of service types, and the transmission rate targets being sorted as a first sequence in a first order;
determining, for the plurality of links, values of non-linear combinations of the transmit powers and the normalized powers corresponding to the plurality of links respectively;
arranging the values of the non-linear combinations corresponding to the plurality of links as a second sequence in the first order; and
providing the transmitters of the plurality of links with location sequence numbers of the values of the non-linear combinations in the second sequence.

10. The device according to claim 9, wherein the values of non-linear combinations of the transmit powers and the normalized powers each comprise a sum of a reciprocal of a normalized power value and a reciprocal of a transmit power value corresponding to a same communication link of the plurality of communication links.

11. A terminal device, comprising:
   a controller; and
   a memory coupled to the controller and having instructions stored thereon, the instructions, when executed by the controller, causing the terminal device to perform acts including:
      obtaining, from a receiver of a first communication link of a plurality of communication links, a first normalized power value of a sum of interference and noise experienced by the receiver, each of the plurality of links supporting a plurality of service types of transmissions, respective transmission rate targets being defined for the plurality of service types according to different qualities of service required by the plurality of service types, and the transmission rate targets being sorted as a first sequence in a first order;
      obtaining a value of a transmission rate target corresponding to the first communication link and determining a service type corresponding to the value of the transmission rate target, the value of the transmission rate target being determined according to the first sequence and a location of a value of a non-linear combination of the first normalized power and a transmit power of a transmitter of the first communication link in a second sequence, the second sequence being obtained by arranging values of a plurality of non-linear combinations corresponding to the following of the plurality of communication links in the first order: normalized power values of sums of interference and noise experienced by receivers of the plurality of communication links, and transmit power values of transmitters of the plurality of communication links;
      obtaining a plurality of maximum normalized power constraint values for the plurality of communication links; and
      updating the transmit power of the first communication link based on a value of a transmission rate target, the first normalized power value and a maximum normalized power constraint value corresponding to the first communication link.

12. The device according to claim 11, wherein the value of the non-linear combination of the first normalized power and the transmit power comprises a sum of a reciprocal of a normalized power value and a reciprocal of a transmit power value.

13. The device according to claim 12, wherein the acts further include:
      updating the transmit power of the first communication link as a first transmit power value based on the transmission rate target and the first normalized power value of the first communication link; and
      updating the transmit power of the first communication link as a second transmit power value based on the maximum normalized power constraint value and the first transmit power value.

14. The device according to claim 13, wherein the acts further include:
      updating the transmit power of the first communication link as the first transmit power value based on an equation:

$$p'_n(t+1) = 2^{\gamma_{R_t(n)}} \frac{I_n(t)p_n(t)}{I_n(t) + p_n(t)}, n = 1, 2, \ldots, N$$

where $p'_n(t+1)$ represents the first transmit power value of a nth communication link among the plurality of communication link at a time t+1, $\gamma_{R_t(n)}$ represents the transmission rate target of the nth communication link at a time t+1, $I_n(t)$ represents the first normalized power value of the nth communication link at a time t+1, $p_n(t)$ represents a transmit power of the nth communication link at a time t+1, t is an arbitrary integer that is greater than or equal to 0, and N is an arbitrary integer that is greater than or equal to 2.

15. The device according to claim 14, wherein the acts further include:
      updating the transmit power value as the second transmit power value based on an equation:

$$p_n(t+1) = \frac{p'_n(t+1)}{\overline{P}}, n = 1, 2, \ldots, N$$

where $p_n(t+1)$ represents the second transmit power value of the nth communication link among the plurality of communication links at the time t+1, and $\overline{P}$ represents the maximum normalized power constraint value.

16. The device according to claim 15, wherein the maximum normalized power constraint value is determined based on an equation:

$$\overline{P} = \max_{m=1,2,\ldots,M} \frac{1}{\overline{P}_m} \sum_{n=1}^{N} w_{mn} p'_n(t+1)$$

where M represents the number of power constraints and M≥1, $w_{mn}$ represents weights of the power constraints and $w_{mn} \geq 0$, and $\overline{P}_m$ represents a power upper-limit value corresponding to a mth power constraint among the power constraints.

* * * * *